(12) United States Patent
Bowen et al.

(10) Patent No.: US 9,412,525 B2
(45) Date of Patent: Aug. 9, 2016

(54) ANODE FOILS FOR ELECTROLYTIC CAPACITORS AND METHODS FOR MAKING SAME

(71) Applicant: Pacesetter, Inc., Sunnyvale, CA (US)

(72) Inventors: David R. Bowen, Taylors, SC (US); Ralph Jason Hemphill, Pickens, SC (US); Xiaofei Jiang, Clemson, SC (US); Corina Geiculescu, Easley, SC (US); Tearl Stocker, Easley, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 9 days.

(21) Appl. No.: 14/581,844

(22) Filed: Dec. 23, 2014

(65) Prior Publication Data

US 2015/0114926 A1 Apr. 30, 2015

Related U.S. Application Data

(63) Continuation of application No. 13/194,760, filed on Jul. 29, 2011, now Pat. No. 8,992,787.

(51) Int. Cl.
| | |
|---|---|
| *C03C 15/00* | (2006.01) |
| *H01G 13/00* | (2013.01) |
| *H01G 9/00* | (2006.01) |
| *H01G 9/04* | (2006.01) |

(52) U.S. Cl.
CPC ............. *H01G 13/00* (2013.01); *H01G 9/0029* (2013.01); *H01G 9/04* (2013.01)

(58) Field of Classification Search
None
See application file for complete search history.

(56) References Cited

U.S. PATENT DOCUMENTS 3,471,383 A * 10/1969 Tiedemann .............. C25B 1/00
204/206
4,420,367 A 12/1983 Locher
6,955,991 B2 10/2005 Bollinger et al.
8,025,829 B2 * 9/2011 Zhang et al. ................. 264/293
2008/0216890 A1 * 9/2008 Lim ............................. 136/252

(Continued)

FOREIGN PATENT DOCUMENTS

JP 06077094 A 3/1994

OTHER PUBLICATIONS

Advisory Action, U.S. Appl. No. 13/194,760, mailed Nov. 5, 2014, 3 pages.

(Continued)

*Primary Examiner* — Binh X Tran
*Assistant Examiner* — David Cathey, Jr.
(74) *Attorney, Agent, or Firm* — Theresa A. Raymer

(57) ABSTRACT

Anode foils suitable for use in electrolytic capacitors, including those having multiple anode configurations, have improved strength, reduced brittleness, and increased capacitance compared to conventional anode foils for electrolytic capacitors. Exemplary methods of manufacturing an anode foil suitable for use in an electrolytic capacitor include disposing a resist material in a predetermined pattern on an exposed surface of an anode foil substrate such that a first portion of the exposed surface of the anode foil substrate is covered by the resist material, and a second portion of the exposed surface remains uncovered; polymerizing the resist material; exposing at least the second portion of the exposed surface to one or more etchants so as to form a plurality of tunnels; stripping the polymerized resist material; and widening at least a portion of the plurality of tunnels. The resist material may be deposited, for example, by ink-jet printing, stamping or screen printing.

20 Claims, 16 Drawing Sheets

(56) References Cited

U.S. PATENT DOCUMENTS

2008/0233307 A1 9/2008 Satou et al.
2008/0253085 A1 10/2008 Soffer

OTHER PUBLICATIONS

Final Office Action, U.S. Appl. No. 13/194,760, mailed Jul. 2, 2014, 18 pages.
Non-Final Office Action, U.S. Appl. No. 13/194,760, mailed Dec. 30, 2013, 20 pages.
Restriction Requirement, U.S. Appl. No. 13/194.760, mailed Aug. 6, 2013, 6 pages.
JPO, JPO machine translation of JP06-77094 A, Nov. 1, 2013, JPO.
D. Altenpohl et al, Hydrated Oxided Films on Aluminum, Jul. 1961, Journal of the electrochemical society, p. 628-631.
Derwent—1994-129852, 2013, Derwent.

* cited by examiner

Figure 6: Patterned Production Substrate

Figure 12: After process completion
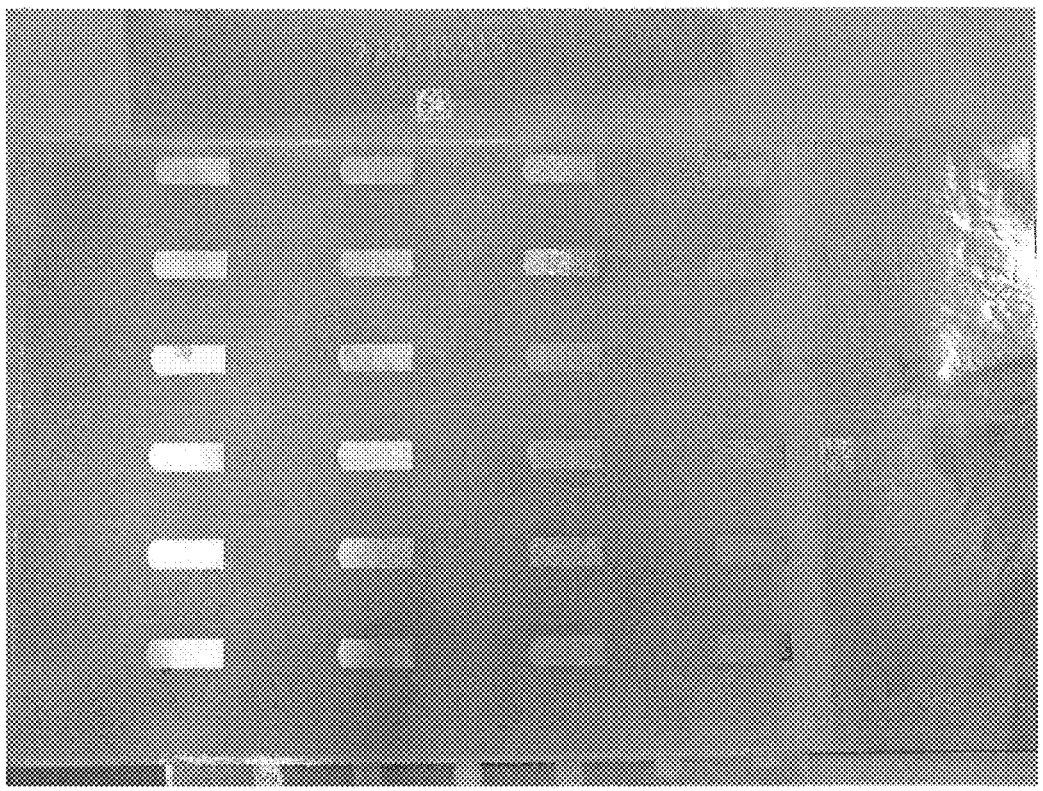

Figure 13: SEM Images of Mask Transition
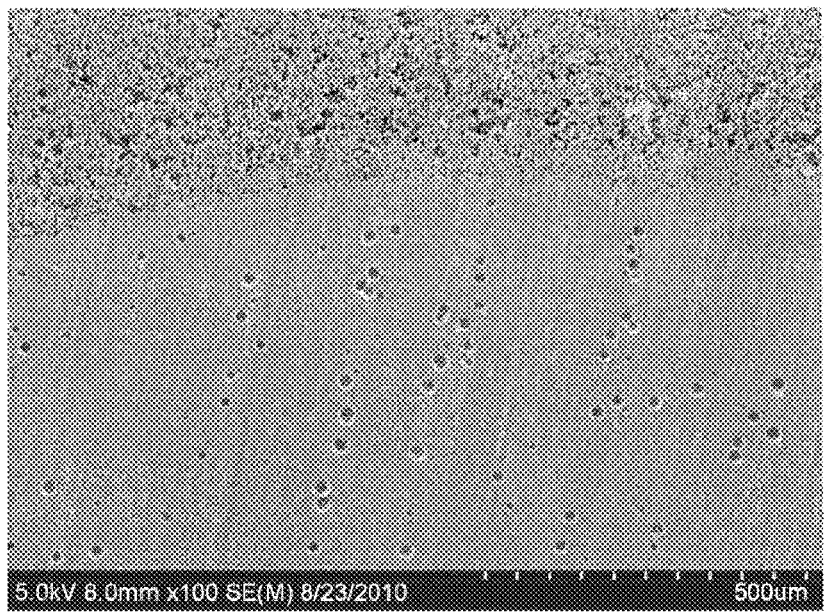
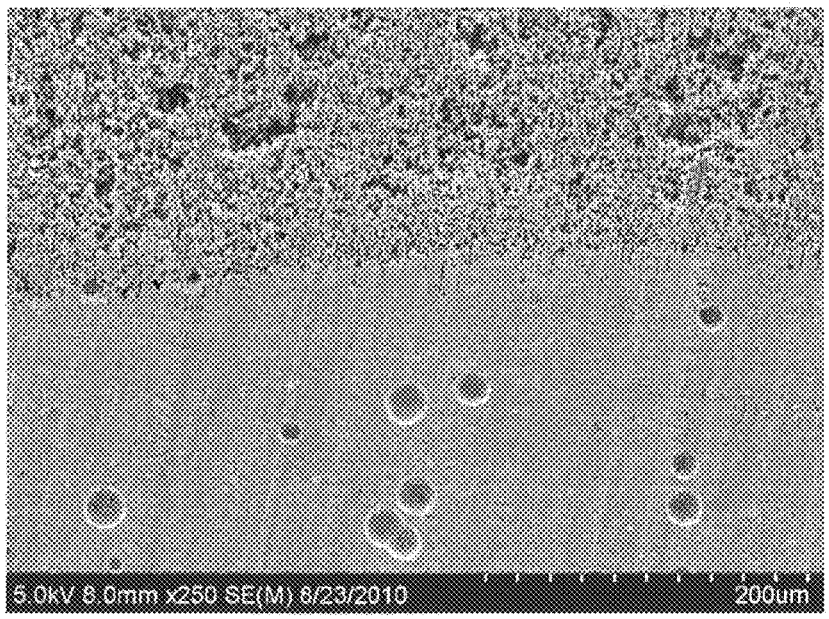

Figure 14: Sheet Foil Capacitance Versus PSSA Amount Added
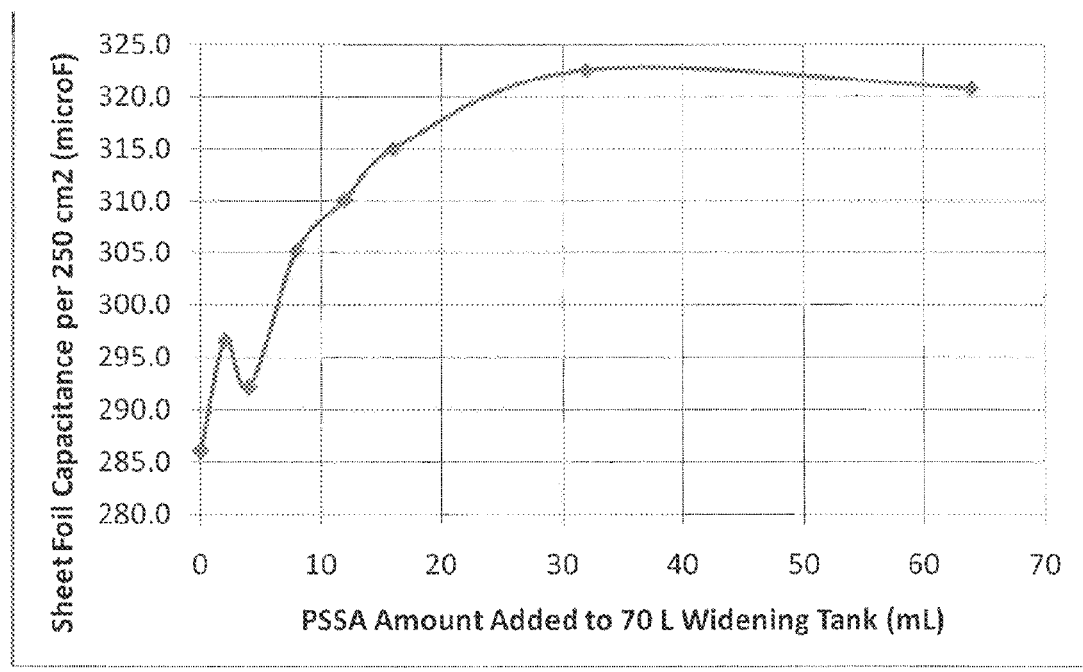
Figure 15: SEM Cross Section of Foil With and Without Using PSSA
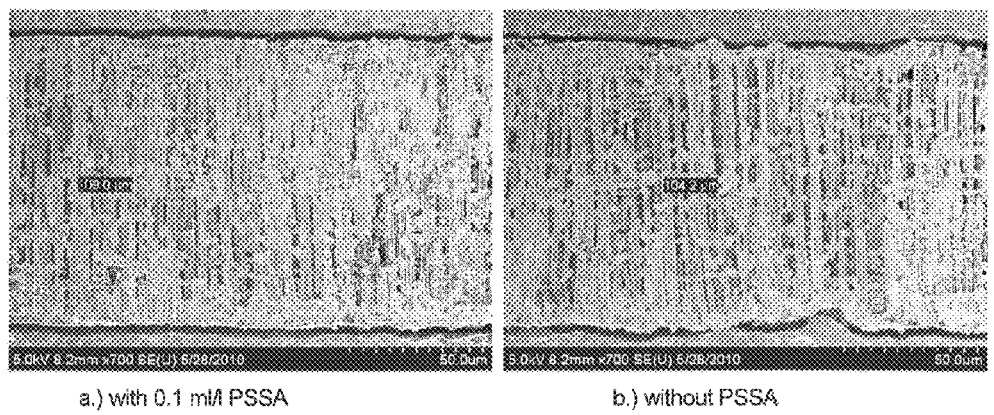
a.) with 0.1 ml/l PSSA            b.) without PSSA

ANODE FOILS FOR ELECTROLYTIC CAPACITORS AND METHODS FOR MAKING SAME

BACKGROUND

1. Field of the Invention

The present invention generally relates to the structure of anode foils suitable for construction of electrolytic capacitors and the manufacturing thereof. More particularly, the present invention relates to manufacturing systems and processes for creating a porous anode foil for use in an electrolytic capacitor.

2. Background Art

Compact, high voltage capacitors are utilized as energy storage reservoirs in many applications, including implantable medical devices such as an implantable cardiac therapy device ("ICTD"). These capacitors are required to have a high energy density since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

ICDs typically use two electrolytic capacitors in series to achieve the desired high voltage for shock delivery. For example, an ICD may utilize two 350 to 400 volt electrolytic capacitors in series to achieve a voltage of 700 to 800 volts.

Electrolytic capacitors are used in ICDs because they have the most nearly ideal properties in terms of size, reliability and ability to withstand relatively high voltage. Conventionally, such electrolytic capacitors include an etched aluminum foil anode, an aluminum foil or film cathode, and an interposed kraft paper or fabric gauze separator impregnated with an electrolyte solution. While aluminum is the preferred metal for the anode plates, other metals such as tantalum, magnesium, titanium, niobium, zirconium and zinc may be used. A typical electrolyte solution may be a mixture of a weak acid and a salt of a weak acid, preferably a salt of the weak acid employed in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween.

In ICDs, as in other applications where space is a critical design element, it is desirable to use capacitors with the greatest possible capacitance per unit volume. Since the magnitude of the capacitance of an aluminum electrolytic capacitor is determined largely by the surface area of the anodes, one approach that may be used to increase the energy density in the capacitor is to minimize the volume taken up by the paper and the cathode thereby permitting the number of anodes to be increased or maximized. A multiple anode stack configuration requires fewer cathodes and paper spacers than a single anode configuration and thus reduces the overall size of such an electrolytic capacitor. A multiple anode stack consists of a number of units, each in turn consisting of a cathode, a paper spacer, two or more anodes, a paper spacer and a cathode, with neighboring units sharing the cathode between them. Energy storage density can be increased by using a multiple anode stack configuration element.

In fabricating anode foils for use in an electrolytic capacitor having a multiple anode stack configuration, a physical mask is conventionally used to mask areas during the etching process in order provide unetched tabs, which in turn are used during welding processes. Without the unetched tab areas, welds will not appropriately form the connections between the anodes in a stack configuration. In a conventional process, the physical mask is typically held no less than $1/32$ inch from the foil to create the necessary unetched area. The tab contacting the foil must be created such that a tapered angle from the top of the tab to the tab connecting to the surface is made. The tapered angle allows the transition from unetched to etched area to be less abrupt by tapering the current density. Without the taper, the foil is susceptible to cracking along the transition edge due to a high current density attack.

Conventional methods of preparing anode foils for use in electrolytic capacitors have a variety of constraints and problems which result in reduced efficiency and increased manufacturing costs.

What is needed are improved high capacity anode foils suitable for electrolytic capacitors and methods of making such anode foils.

SUMMARY

High capacity anode foils in accordance with the present invention are produced with a direct application of patterned photoresist rather than with the conventional photoresist process sequence of photoresist application, mask placement, exposure, development, and rinsing. Direct application of patterned photoresist, in accordance with the present disclosure, allows a greater portion of the anode foil substrate to be subjected to surface area enhancement. Since more of the surface area is available for enhancement, typically by tunnel formation, the anode foils produced in accordance with the disclosure, advantageously possess greater charge storage capacity per unit area of starting material.

One exemplary method includes the steps of: disposing a resist material in a predetermined pattern on an exposed surface of an anode foil substrate, such that a first portion of the exposed surface of the anode foil substrate is covered by the resist material, and such that a second portion of the exposed surface is uncovered; polymerizing the resist material; exposing at least the second portion of the exposed surface to one or more etchants to form a plurality of tunnels; stripping the polymerized resist material; and widening at least a portion of the plurality of tunnels.

Anode foils in accordance with the present disclosure, have improved strength, reduced brittleness, and increased capacitance compared to conventional anode foils used in electrolytic capacitors. Such anode foils are suitable for use in electrolytic capacitors having multiple anode configurations. Further, capacitors manufactured with such anode foils are suitable for use in, for example, implantable cardiac therapy devices ("ICTDs") such as implantable cardioverter defibrillators ("ICDs").

BRIEF DESCRIPTION OF THE DRAWINGS

The accompanying drawings, which are incorporated herein and form a part of the specification, illustrate the present invention and, together with the description, further serve to explain the principles thereof and enable a person skilled in the pertinent art to make and use the present invention.

FIG. 12 is a photograph of an anode foil substrate web after process completion.

FIG. 13 shows SEM images of the improved mask transition region on the anode foil.

FIG. 14 is a graph showing sheet foil capacitance as a function of the amount of polystyrenesulfonic acid added to the widening solution.

FIG. 15 shows SEM cross sections of anode foils with and without polystyrenesulfonic acid (PSSA) added to the widening solution

DETAILED DESCRIPTION

Figure 1:
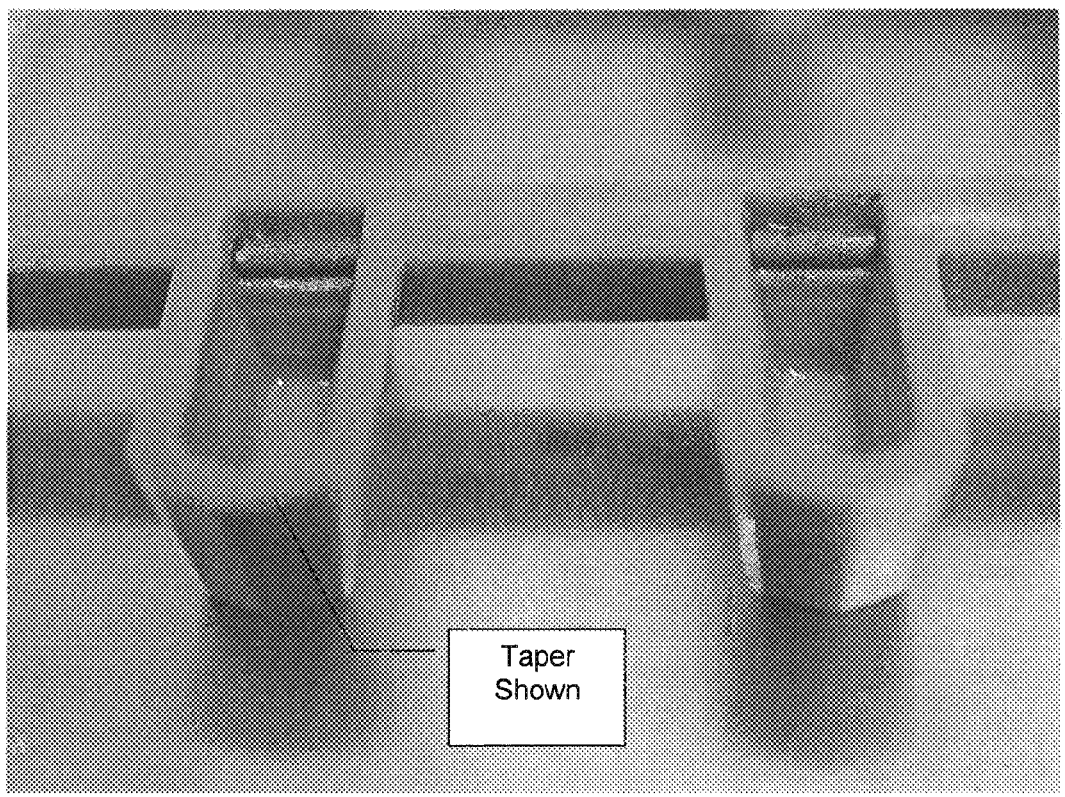
FIG. 1 is a photograph showing the physical mask tab against an anode foil with the tapered edge and the connecting bars.

In the detailed description that follows, references to "one embodiment," "an embodiment," "an illustrative embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It should be understood that not all embodiments of the invention include the discussed features, advantages or modes of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting. For example, as used herein, the singular forms "a", "an" and "the" are intended to include the plural forms as well, unless the context clearly indicates otherwise. It will be further understood that the terms "comprises," "comprising," "includes" "including" and/or "having," when used herein, specify the presence of stated features, steps, operations, elements, and/or components, but do not preclude the presence or addition of one or more other features, steps, operations, elements, components, and/or groups thereof.

The techniques, materials and methods disclosed herein may be used, for example, to manufacture anodes, anode stacks and capacitors containing such anodes and anode stacks, such as those disclosed in U.S. Pat. No. 7,130,183 to Fayram and/or U.S. Pat. No. 7,196,899 to Feger et al. both of which are incorporated herein by reference as if reproduced in full below.

Overview

As noted above, it is desirable in many applications, and particularly with respect to implantable medical devices, to provide electrolytic capacitors having the needed capacitance and further having a small physical size. In order to reduce the physical size of an electrolytic capacitor while maintaining a specified capacitance, it is generally required to increase the charge storage density of the capacitor. One way to increase the charge storage density of an electrolytic capacitor is to increase the surface area of the anode foil that is used in the construction of the capacitor. Various constraints associated with conventional methods of producing anode foils result in a portion of the anode foil starting material not being subjected to tunnel formation. Embodiments in accordance with the present disclosure reduce the inefficiencies in surface area utilization in order to provide anode foils that have increased surface area per unit area of foil starting material.

Anode foils suitable for use in electrolytic capacitors, in accordance with the present disclosure, provide greater surface area than conventional anode foils and thus advantageously provide greater capacitance without requiring additional material or space. In accordance with the present disclosure, conventional patterning operations that include formation of blanket resist layers, placement of optical masks, light exposure through patterned optical masks, and resist development to provide a resist pattern on the surface of the foil are eliminated. Anode foils in accordance with the present disclosure are directly patterned without optical masks, and the improved tolerances of this approach provide additional surface area for tunnel formation, and thus additional charge storage by the anode foil.

Anode foils in accordance with the present disclosure may be used to form electrolytic capacitors, including electrolytic capacitors having multiple anode stacks.

Shortcomings of Conventional Anode Foil Processes

As noted above, there are a variety of constraints and problems associated with conventional methods of manufacturing anode foils for use in electrolytic capacitors. By way of example, the tabs of such anode foils are typically connected to a bar which contributes to an uneven distribution of the current density. Additionally, the tabs are typically made larger than would otherwise be required in order to insure adequate spacing for anode punching. One consequence of the foregoing is that portions of the anode foil which could have been used for tunnel formation, and thus increased capacitance, are not available.

Another problem with conventional methods of manufacturing anode foils for electrolytic capacitors is that, since different capacitor products have different anode shapes, unique tab etch masks must be maintained for each particular product model. Further, current density must be optimized for each etch mask. This leads to cost inefficiency and recurring costs as new products with different anode shapes are introduced.

A further problem with conventional methods of manufacturing anode foils for electrolytic capacitors is that, during fabrication of the anode foils, operators must open and close the mask after placing the foil between the masks for each sheet. This leads to production inefficiency.

In conventional processes of manufacturing anode foils for electrolytic capacitors, resist materials suitable for protecting an underlying area from etching are disposed on a surface of the anode foil. Such resist materials protect the underlying regions during an electrochemical etching process and are typically applied as either a liquid coating or a laminating film to the surface of the substrate that is intended to be etched. The coated substrate is then exposed to ultraviolet radiation through an optical contact mask to selectively polymerize areas where the resist is to remain after immersion in chemical developer solution and rinsing. It is noted that the substrate may be an anode film such as but not limited to aluminum. It is further noted that although this process is described in terms of a negative resist material, those skilled in the art will recognize that this discussion also applies to processes using a positive resist and masks with reversed fields. Some of the issues associated with conventional processing are: a) the cost of procuring and disposing of the consumable etch chemistry, which in a conventional process includes having to coat the entire substrate with resist; b) the cost of procuring and maintaining the required coating/laminating equipment; c) the costs associated with producing, storing, and using the required optical exposure masks; d) the costs associated with the procurement and disposal of the chemical developer that is required to selectively dilute and wash away the unpolymerized resist after exposure, along with the rinsing step to remove the developer; and e) the costs associated with the steps of chemical resist stripping and rinsing, which occur subsequent to resist patterning and substrate etching. It is further noted that the developer chemical can be deleterious to the subsequent etch process by either contaminating the substrate surface or adversely modifying requisite thermal oxides for optimum etch performance metrics.

Advantages of Embodiments of the Anode Foil Processes

In accordance with the present disclosure, improved anode foils and methods of fabricating these improved structures are provided. Various advantages and benefits accrue for the embodiments disclosed herein. An elaboration of some of these advantages and benefits is provided below. It is noted that the following list of advantages and benefits is for purposes of illustration and not limitation.

More particularly, various embodiments enable low-cost continuous web-type automated etching processes suitable for the preparation of anode foils for capacitors, and these processes typically have fewer steps or operations than conventional processes for the preparation of anode foils for capacitors In various embodiments in which the photoresist is printed onto the anode foil substrate, "on-the-fly" web marking/coding may be performed.

Advantageously, little or no contribution to the chemical waste stream is added by embodiments disclosed herein.

A further advantage is that no hardware that is specific to the desired pattern is required. In other words, the finished etch geometry can be defined solely by digital data in embodiments wherein application of the photoresist is accomplished by ink jet type dispensing.

Thermal removal of the photoresist prevents having to use a chemical developer that is conventionally required to selectively dilute and wash away the undesired resist after exposure, along with a rinsing step to remove the developer. The developer can adversely affect the etch process by either contaminating the substrate surface or undesirably modifying requisite thermal oxides for optimum etch performance metrics. Additionally, there is a cost entailed due to the consumable developer chemistry, processing equipment, and chemical waste stream.

The conventional step of a mask being held against the foil is not needed. In accordance with the present disclosure, the size of markings of areas to prevent etching can be in the 10 micron range in various illustrative embodiments as compared to ⅛ inch or larger for the conventional process using a physical mask Wavy lines, straight lines, dots, low dpi (dots per inch) resolution tapering, and so on, can be used to create areas of high strength and to create areas of highly localized etching due to the current density attack.

In some embodiments, a frame is printed, or otherwise formed, on the edges of the foil. Such a frame reduces or prevents over-etching on the edges. Such over-etching may be due to high etch current density sites.

Various embodiments provide increased rates of production as compared to conventional laser marking operations. More particularly, in some embodiments the etch resist is placed on the foil and cured by UV at the rate of about 2 to 5 ft/sec versus 5 to $10 \times 10^{-3}$ ft/sec for laser marking operations. Laser marking is disclosed in U.S. Pat. No. 7,452,473 to Hemphill et al., which is incorporated herein by reference.

In various illustrative embodiments, the use of tapering techniques with the photoresist deposition, as opposed to relying on holding a physical mask against the foil with bars, advantageously improves the current density distribution.

Various embodiments obviate the need for an optical mask that is held against the anode foil substrate during etching. Therefore, cost efficiency is increased due to software-driven computer control of disposing the resist in a desired pattern on the anode foil substrate. In this way, the desired pattern of etch resist can be changed without having to design and/or obtain new hardware, such as but not limited to, masks. Maintenance costs associated with keeping the masks within the 1/32 inch of the anode foil substrate are also eliminated. Another advantage is that by not using an optical mask held against the foil, the size of the unetched area can be reduced significantly. Therefore, more of the punched anode can be etched.

Various embodiments provide a greater etched area as compared to conventionally processed anode foils, and therefore will have less waviness which would conventionally result from the increased density of oxide and the effect on varying levels of surface area. The greater etched area of embodiments in accordance with the present invention leads to thinner capacitor stacks.

Various embodiments enable more anodes to be punched per unit area of foil, because a connection bar between the tab areas is not needed. In this way, lower foil waste is achieved.

For anode foils prepared in accordance with the present disclosure, the etch current density can be leveled and made more consistent without causing brittleness at the interface between the etched and unetched areas of the foil. This advantageously provides higher foil capacitance per anode without compromising strength.

Using the various masking techniques disclosed herein can lead to a higher stored energy per volume and improve packaging efficiency without having to increase etch coulombs/cm$^2$ (time) and aluminum removal which can lead to brittleness of the anode foil.

The use of polystyrenesulfonic acid (PSSA) in the widening solution, in accordance with the present disclosure, shows as much as 12% gain in sheet capacitance as compared to the conventional process of manufacturing anode foils. The use of PSSA in the widening solution advantageously reduces brittleness at the interface between the etched and unetched areas of the foil. The use of PSSA improves the anode foil strength at the transition between fully etched and non-etched foil by reducing the unwanted removal of aluminum at the high current density to low current density transition edge.

Exemplary Processes of Anode Foil Formation

The total capacitance of an electrolytic capacitor is related to the physical structure of the anode foil. More particularly, this capacitance is increased by forming surface area enhancing tunnels. The surface area enhancing tunnels are typically formed by an electrochemical etching process. In the case of an aluminum anode foil, the tunnels in the foil surface may be formed by dissolution of the aluminum along the [100] crystal orientation. After the etching process, a widening process increases the diameter of the tunnels formed during the etching process. In order to create a high surface area foil, a significant amount of aluminum is removed, which leads to brittleness after a high quality oxide is formed on the foil. Those skilled in the art will appreciate that the high quality oxide is formed on the foil to a thickness that will support a predetermined voltage, or range of voltages.

Various embodiments use a resist material, also referred to as a photoresist, applied in specific areas, patterns, and arrangements in order to mask, i.e., protect, certain areas during a subsequent etching process. In accordance with the present disclosure, the resist is directly patterned onto an anode foil substrate by ink-jet, screen printing, stamping, pad application, or similar techniques.

Ink-jet type photoresist delivery systems provide high resolution placement of the photoresist onto a substrate such as an anode foil starting material. Ink-jet type photoresist delivery systems are also easily controlled with digital information that represents the desired pattern. Digitally controlling the photoresist pattern by downloading data to the ink-jet type dispenser allows a manufacturing line to quickly convert from the production of one product to another simply by transmitting new pattern data to the dispenser.

Figure 2:
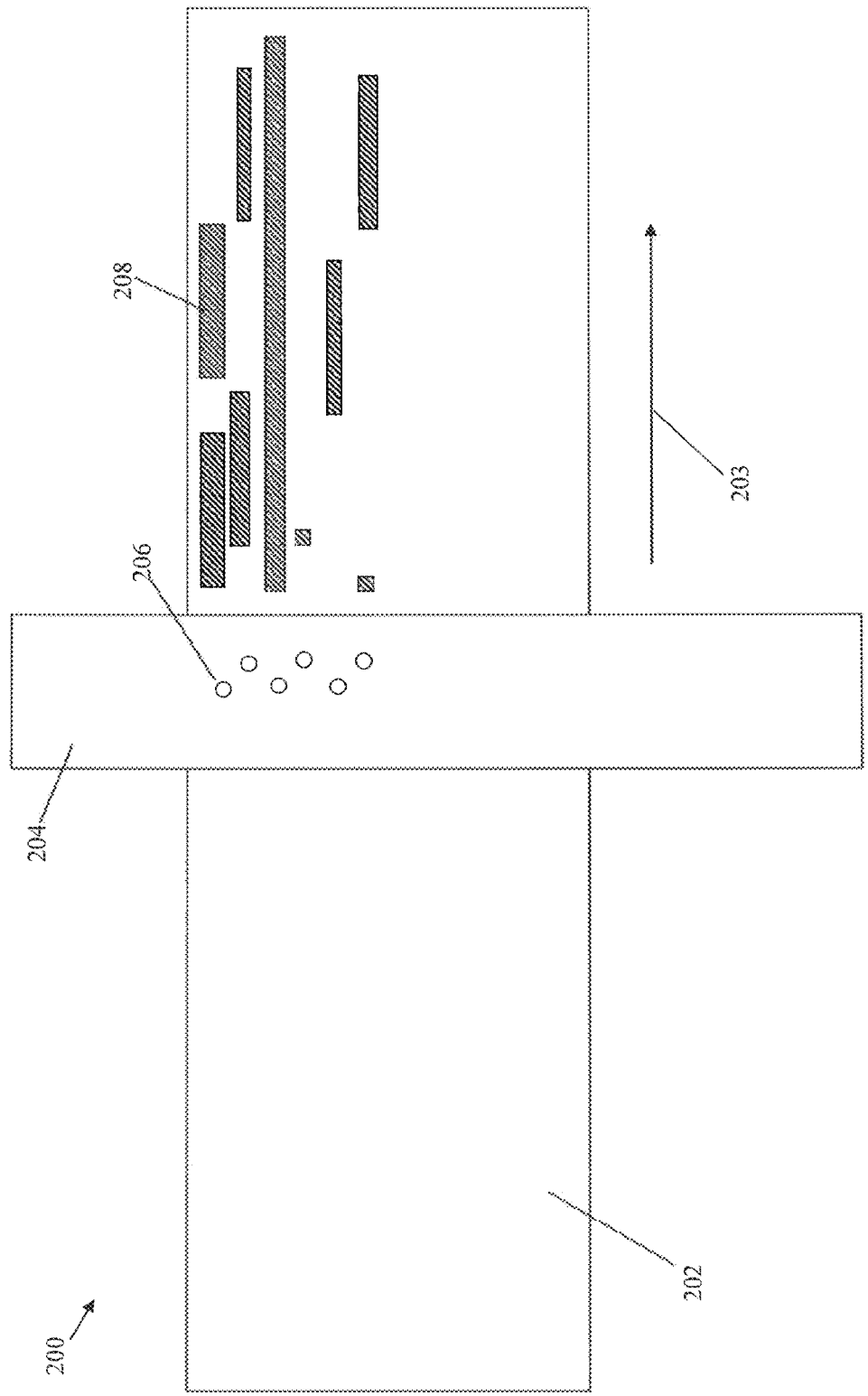
FIG. 2 is a high level block diagram illustrating ink-jet printing of photoresist on a continuous web of anode foil starting material.

FIG. 2 shows a high level block diagram of an illustrative manufacturing system 200 with a continuous web of anode foil starting material 202 passing under an ink-jet type of photoresist delivery system 204. Anode foil 202 moves in the direction of arrow 203. In this illustrative embodiment, the anode foil starting material is aluminum but the invention is not limited to a particular anode foil material. As the web of anode foil starting material 202 passes ink-jet type photoresist delivery system 204, nozzles 206 direct photoresist onto the passing anode foil material 202. It will be appreciated that nozzles 206 are directed toward anode foil 202.

There may be more or fewer nozzles 206 than those indicated in FIG. 2. Photoresist 208 is dispensed onto starting material 202 as shown. The illustrated photoresist pattern is for the purpose of description and does not necessarily represent the photoresist pattern of any particular product. It will be appreciated that nozzles 206 may be spaced closer together or farther apart, and that there may be a single row of nozzles or a plurality of rows of nozzles.

In some embodiments, the anode foil starting material is in the form of individual sheets, while in other embodiments the starting material may be in the form of a continuous web.

In the case of web-based processes, the anode foil starting material may move past, under, or by one or more fixed-position nozzles that dispense photoresist. In alternative embodiments, the anode foil may move into a predetermined position, and then stop while one or more movable nozzles move relative to the anode foil starting material to dispense photoresist. Once the predetermined pattern of photoresist has been printed, the web may then be moved so that the portion of the foil with the printed photoresist appears at a next work station in the manufacturing process. Starting and stopping of the web may be referred to as a step and repeat process rather than a continuous process.

It is noted that alternative embodiments may include dispensing photoresist from a moving nozzle while the web is also moving. In further alternative embodiments the web may move forward and back relative to one or more photoresist dispensing nozzles.

In some alternative embodiments, markings, such as but not limited to, product markings or other informational markings, may be formed by masking areas from, or exposing areas to, one or more etching operations. Typically, product or informational markings do not provide an electrical function in the finished product. In these alternative embodiments, the photoresist patterns that define the markings may be dispensed by the same nozzles that defined the functional aspects of the anode foil, or by a different set of nozzles. This different set of nozzles may be present in the same inkjet type of photoresist delivery unit or in a different photoresist delivery unit.

In various alternative embodiments, alignment marks may be formed on the anode foil starting material so that this substrate or web may be aligned with the photoresist dispensing nozzles.

In still further alternative embodiments, adjacent portions of the anode foil starting material may have different predetermined patterns of photoresist disposed thereon by the process described herein. These different photoresist patterns can represent different products. Manufacturing different products is done without the manufacturing inefficiencies of conventional processes wherein a physical optical mask must be changed in order to change the photoresist pattern. More particularly, the operation of inkjet type photoresist delivery system 204 is typically controlled by digital data that controls when each of the nozzles is turned on and off. It is noted that the digital data that controls photoresist delivery system 204, can typically be changed by simply writing, or storing, new pattern data therein. Such memory updates are achieved very rapidly in comparison to physically changing the optical mask used in conventional processes. In this way, any number of predetermined resist patterns can be formed on adjacent sections of the foil, and switching from one pattern to another can be done "on-the-fly."

In further alternative embodiments, a plurality of inkjet type photoresist delivery systems may be arranged in series along the path of an anode foil starting material web. In such embodiments, each of the plurality of inkjet type photoresist delivery systems dispenses photoresist to form a corresponding plurality of predetermined photoresist patterns. Such parallelism increases manufacturing efficiencies. It is noted that once the plurality of patterns is dispensed, the web moves (or continues moving) along the manufacturing line far enough such that each of the plurality of inkjet type photoresist delivery systems is aligned with a different portion of the web that preferably does not already have a photoresist pattern thereon.

Figure 3:
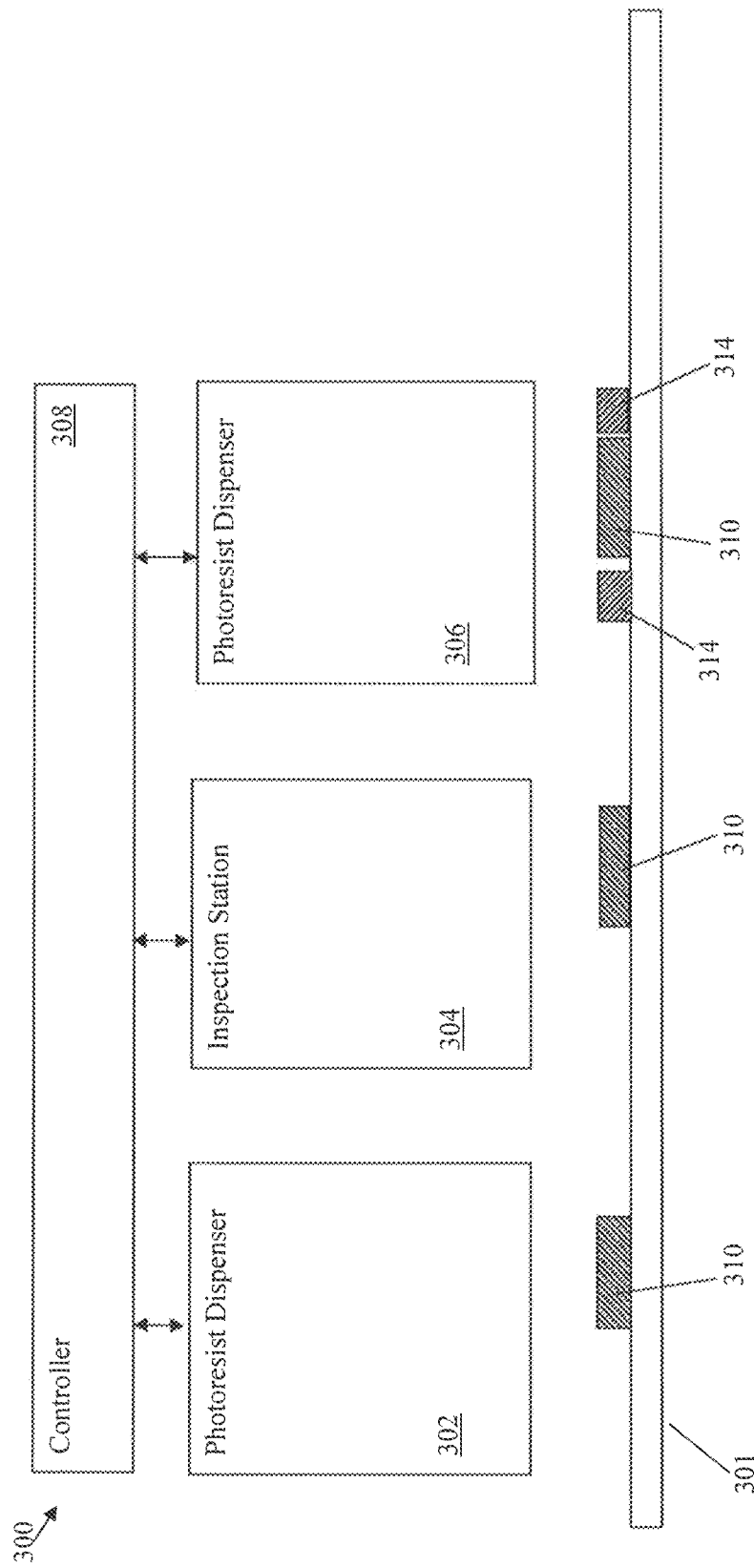
FIG. 3 is a high level block diagram illustrating a manufacturing system for ink-jet printed photoresist.

FIG. 3 shows a high level block diagram of an illustrative manufacturing system 300 with multiple work stations 302, 304, 306. In this embodiment, a web of anode foil starting material 301 is passed by and/or through various work stations, such as, but not limited to, a first photoresist dispensing unit 302 (e.g., photoresist delivery system 204 of FIG. 2), an inspection station 304, and a second photoresist dispensing unit 306 (e.g., photoresist delivery system 204 of FIG. 2). In this embodiment, first photoresist dispensing station 302 is an inkjet type of photoresist delivery system. In this illustrative embodiment, a photoresist pattern 310 is directly dispensed on starting material 301. Inspection station 304 may be used to determine whether the desired predetermined pattern of photoresist has been formed. This is done by capturing a digital image of the pattern 310 formed on the starting material 301 and comparing the captured digital image data with a stored digital version of a desired photoresist pattern. Inspection stations of this type are known, and may include one or more illumination sources (e.g., LEDs, halogen light, xenon light, incandescent light, and so on), and one or more image sensors (e.g., CMOS, CCD). Captured image data representing the pattern 310 as it is formed on the anode foil starting material 301, can be compared to the stored digital version of the desired pattern either within inspection station 304, or the captured image data can be sent to a controller 306 for processing. In either case, inspection station 304 communicates with controller 308 so that a determination can be made on whether the newly printed photoresist pattern (310) matches, within some predetermined error tolerance, the desired photoresist pattern.

Still referring to the illustrative embodiment of FIG. 3, the second photoresist dispensing unit 306 dispenses additional photoresist 314 onto anode foil starting material 301. Photoresist 314 may be part of the desired pattern, or it may be for a purpose not related to the electrical performance of the anode foil, such as an informational marking. In an alternative embodiment, responsive to a determination that photoresist 310 has not been properly formed, controller 308 directs second photoresist dispensing unit 306 to dispense additional photoresist such that that a section of starting material 301 is covered in its entirety and thus protected from a subsequent etching operation. In this way, the section of starting material 301, which had an improperly formed resist pattern, can be preserved for later recovery and possibly for rework. In yet another embodiment, second photoresist dispensing unit 306 can dispense additional photoresist such that any missing portions of photoresist identified by inspection station 304 can be deposited on material 301.

It will be appreciated that embodiments may include more or fewer work stations than those indicated in FIG. 3.

Figure 4:
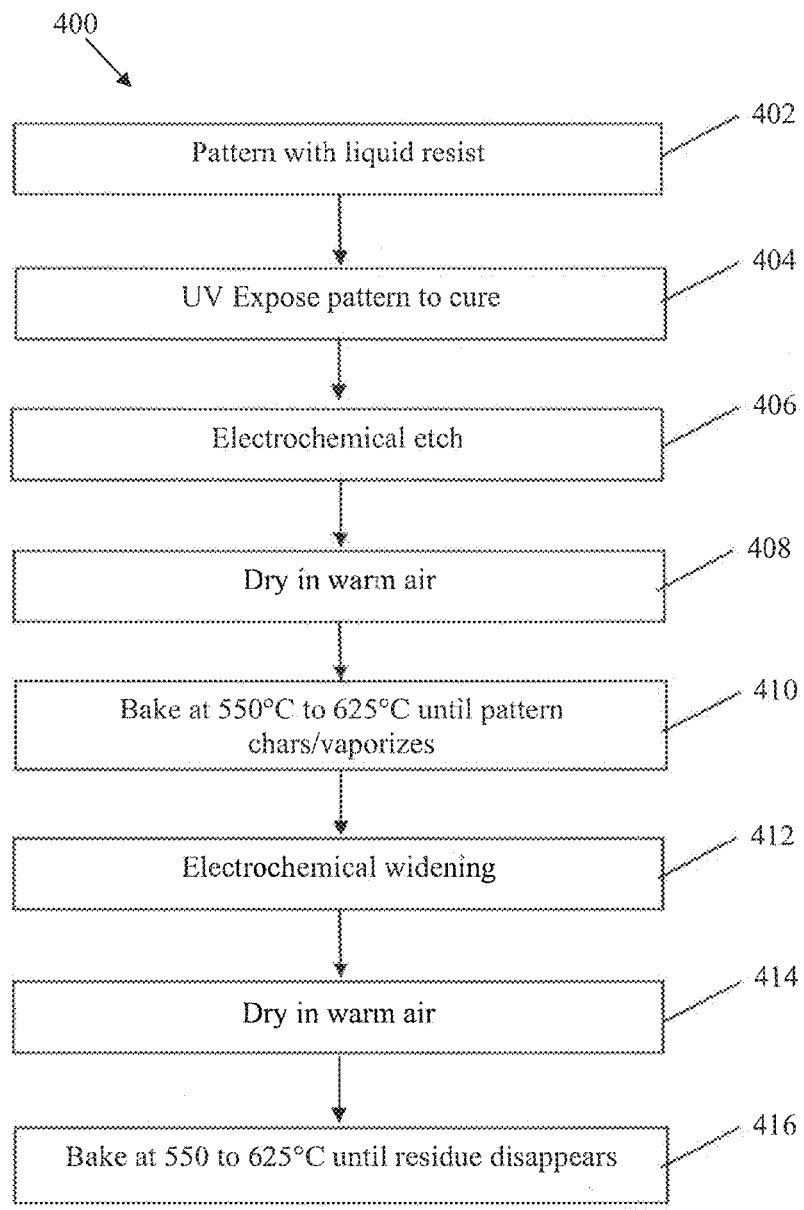
FIG. 4 is a flow diagram of a process of manufacturing anode foils for use in capacitors.

Referring to FIG. 4, an exemplary process 400 in accordance with the present disclosure is described. Exemplary process 400 includes applying a liquid resist material in the predetermined pattern as shown at step 402. This is different from conventional processes of anode foil manufacturing wherein a blanket layer of resist is disposed on the anode foil substrate, an optical mask is physically placed adjacent the blanket layer of resist, and then exposure to a light source polymerizes the exposed resist material (i.e., in a negative resist process). By contrast, various embodiments in accordance with the present disclosure, apply the resist to the anode foil substrate in a predetermined pattern rather than as a blanket layer. In some embodiments, the application of the resist is accomplished by means including, but not limited to, ink jet printing, stamping, screening, and so on. Various embodiments use a resist material that includes acrylic monomers and ultraviolet photo initiators. The predetermined pattern is designed such that when anodes are punched from the foil subsequent to the tunnel forming etch step, the edges of the anode will contain unetched areas. After the resist material is applied in the desired pattern, it is cured in a step 404 into a polymer with appropriate wavelength illumination for requisite time at sufficient radiant energy. Those skilled in the art will recognize the well-known parameters for curing resist materials, and may determine appropriate wavelengths, intensities, and exposure times for a particular resist formulation without undue experimentation.

After the resist is cured in step 404, the anode foil substrate is exposed to an etching medium at step 406. In various embodiments, subsequent to etching step 406, the anode foil substrate is dried in a step 408 in, for example, warm air. The resist pattern is then decomposed to vapor and inert ash (sometimes referred to as soot) by baking in a step 410 at a temperature requisite to break down and oxidize the polymer film for the amount of time required for consumption of the volume of the patterned polymer. In embodiments using a resist material that includes acrylic monomers and ultraviolet photo initiators, baking step 410 is performed at a temperature, for example, in the range of about 550° C. to 625° C.

The anode foil substrate can then be processed as usual in an electrochemical widening process in step 412, which loosens/washes away remaining soot on the substrate surface. The soot is innocuous, and any particles removed can be separated from the widening solution via filtration.

In some embodiments, subsequent to widening step 412, the substrate is dried in step 414 in, for example, warm air. It is possible at this point that some residue has remained on the foil substrate. Various embodiments include baking in step 416, at a temperature, for example, in the range of about 550° C. to 625° C. until the residue disappears.

Experimental Results of Resist Material Testing

With respect to determining a suitable composition of a resist material, various investigations and experiments were conducted, and are described below.

Many adhesives, coatings, and casting compounds are made of acrylic polymers which are compounds of carbon, hydrogen, and oxygen, and have excellent chemical and thermal stability. This stability makes them suitable for use as temporary coatings to serve as masking agents to selectively protect areas of an underlying substrate during various manufacturing processes, such as chemical/electrochemical etching. It will be appreciated that an appropriate resist formulation is needed to successfully implement embodiments of the present invention. In typical embodiments, a liquid resist formulation is used. Requirements include stability in the desired etch solution at the highest expected process temperature, stability at a temperature lower than the maximum permissible for the anode foil substrate, and no components which would leave residue adverse to subsequent manufacturing operations. In typical embodiments the anode foil substrate is aluminum, but the present invention is not limited to a particular material for the substrate.

An example of a compatible etch resist is CircuitJet200, available from MacDermid, Inc. of Denver, Colo. This is a product primarily consisting of acrylic monomers, which can be cured to a protective polymer with ultraviolet energy at the common 365 nm wavelength, and has viscous properties compatible with commercial piezoelectric ink-jet technology. The intended use of the product is in commercially available flat-bed printers of the format manufactured by Orbotech, Inc., of Billerica, Mass., for the rapid production of electronic circuit boards.

A similar product, although excessively viscous for inkjetting, is MicroTrace, available from the same manufacturer, and commonly used in the production of etched metal "legend plates" and signage. Samples of both products were acquired, and their thermal behavior (i.e., decomposition pattern as a function of temperature) was investigated by thermo gravimetric analysis (TGA). It was found that both materials break down to carbonaceous ash and gas at temperatures low enough such that the integrity of the substrate is not compromised upon heating.

Figure 5:
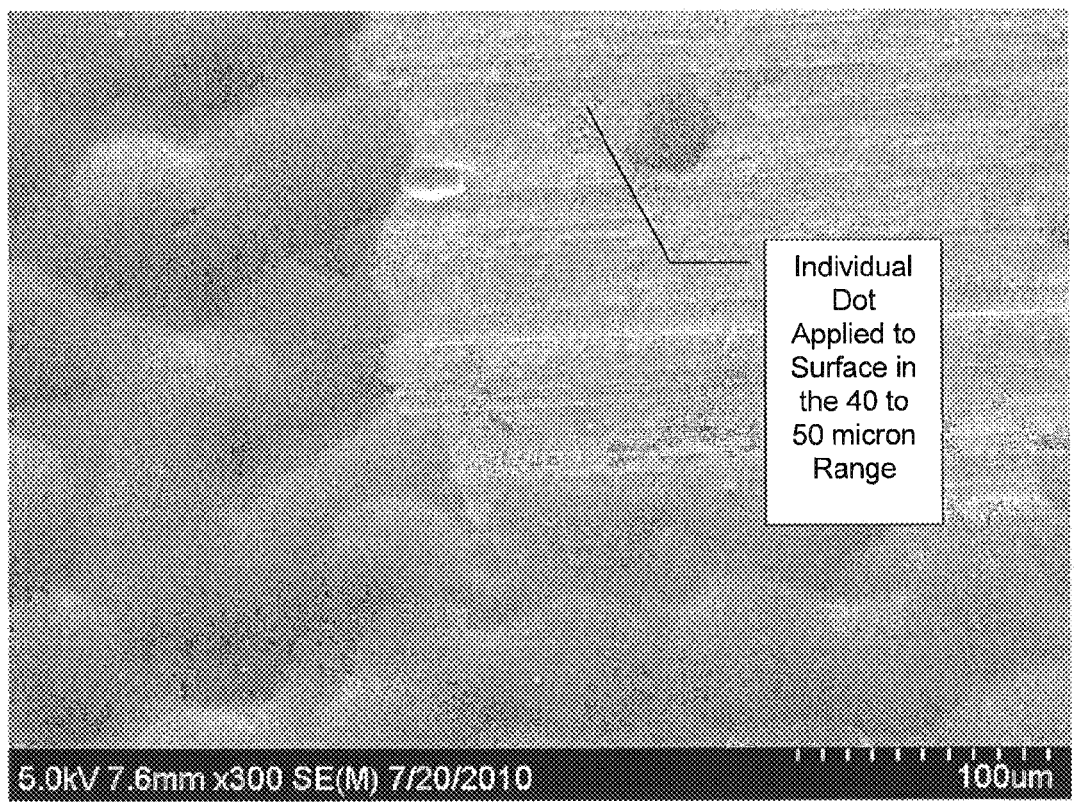
FIG. 5 is a scanning electron microphotograph (SEM) showing an individual dot of resist material disposed on the surface of an anode foil.
Figure 6:
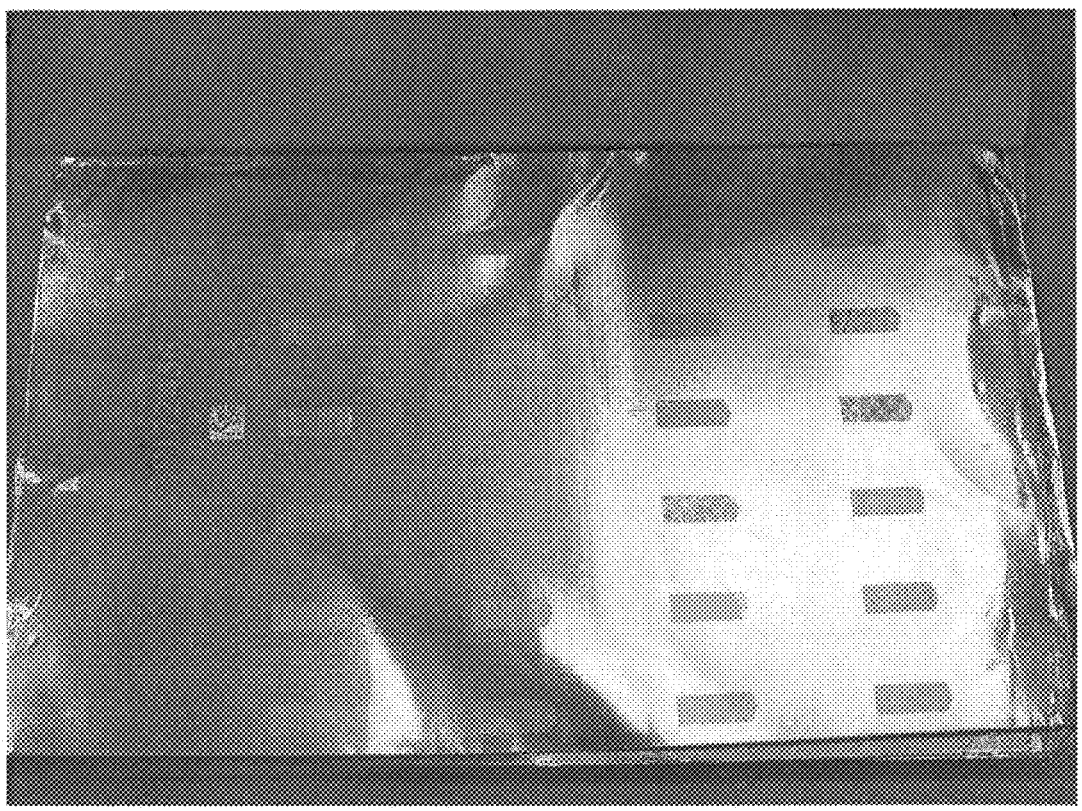
FIG. 6 is a photograph of a patterned production substrate.

Samples of production aluminum (Al) foil were patterned on an Orbotech printer to mask areas equivalent to those typically protected in the conventional etch process via mechanical etch masks. FIG. 5 is a scanning electron microphotograph (SEM) showing an individual dot of resist material disposed on the surface of the foil. FIG. 6 is a photograph showing the patterned production substrate.

Figure 7:
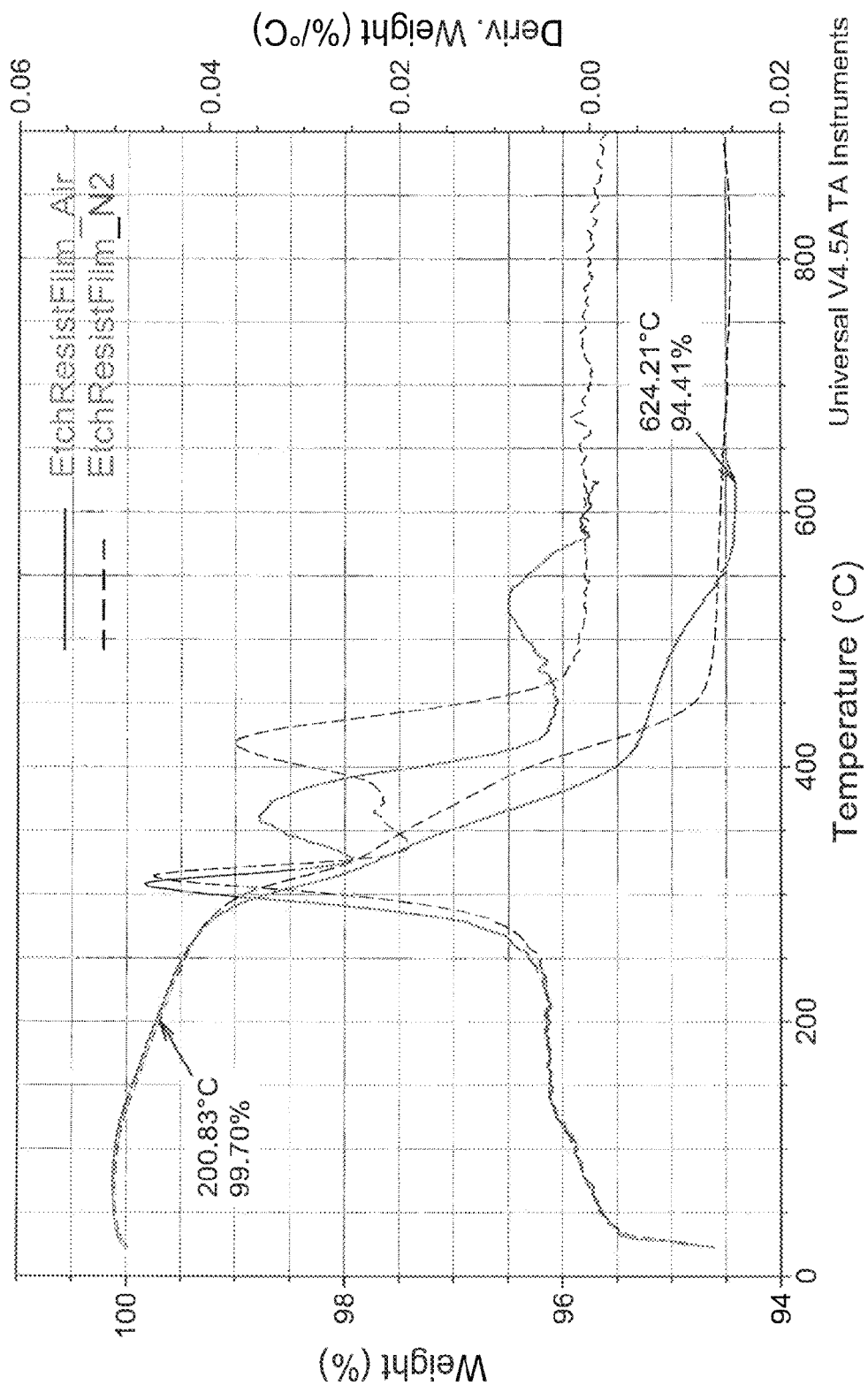
FIG. 7 is a graph of weight % versus temperature for the thermogravimetric behavior of CircuitJet200 Film on an aluminum (Al) substrate in both air and molecular nitrogen ($N_2$).

Thermal behavior of these UV-cured films was further investigated in order to assess the viability of such a polymer for aluminum electrolytic capacitor anode manufacturing. FIG. 7 shows the thermogram of the CircuitJet200 film UV-cured on an Al substrate. As shown, the polymer film completely breaks down at a temperature well below 700° C., more accurately between 200 and 625° C. for treatment in either an inert (e.g., nitrogen) or air environment. Decomposition is accelerated by the air environment, being almost complete at 450° C. Residual solvent trapped inside the polymer is released between 450 and 625° C. leaving behind just a carbonaceous ash that can be removed during the subsequent widening process.

Figure 8:
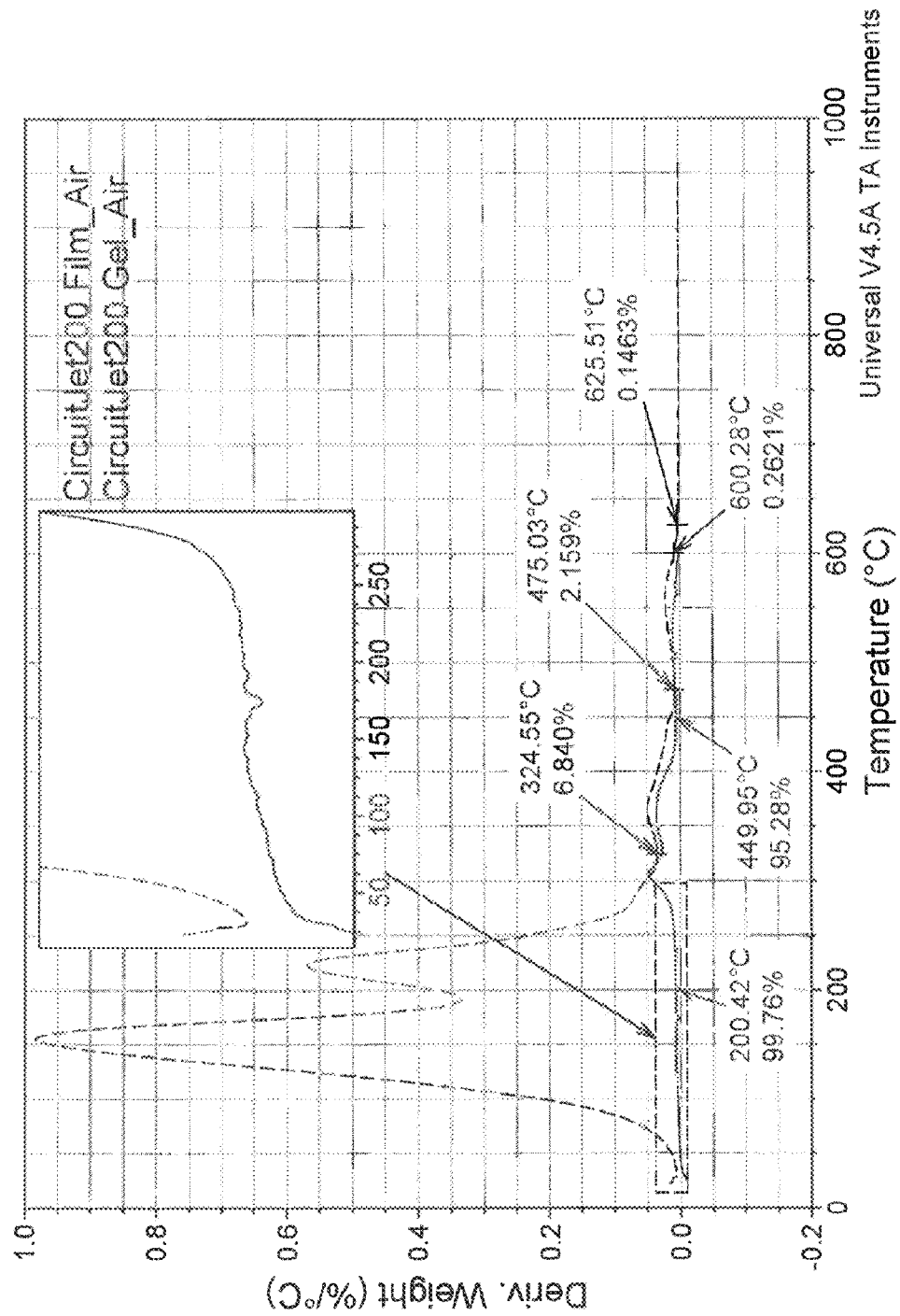
FIG. 8 is a graph of Derivative Weight (%/° C.) versus temperature for both CircuitJet200 Film in air, and CircuitJet200 Gel in air.

FIG. 8 presents a comparison between the CircuitJet200 Gel before casting and curing and the film obtained at the end of the process. The TGA micrograph shows that approximately 93% of the gel weight is lost below 325° C. with the remaining part being decomposed below 625° C. The UV cured film shows no decomposition pattern below 200° C., all the material being removed during the thermal breakdown in the 200 to 625° C. range, which is directly correlated to the weight loss observed in the gel material below 325° C.

Figure 9:
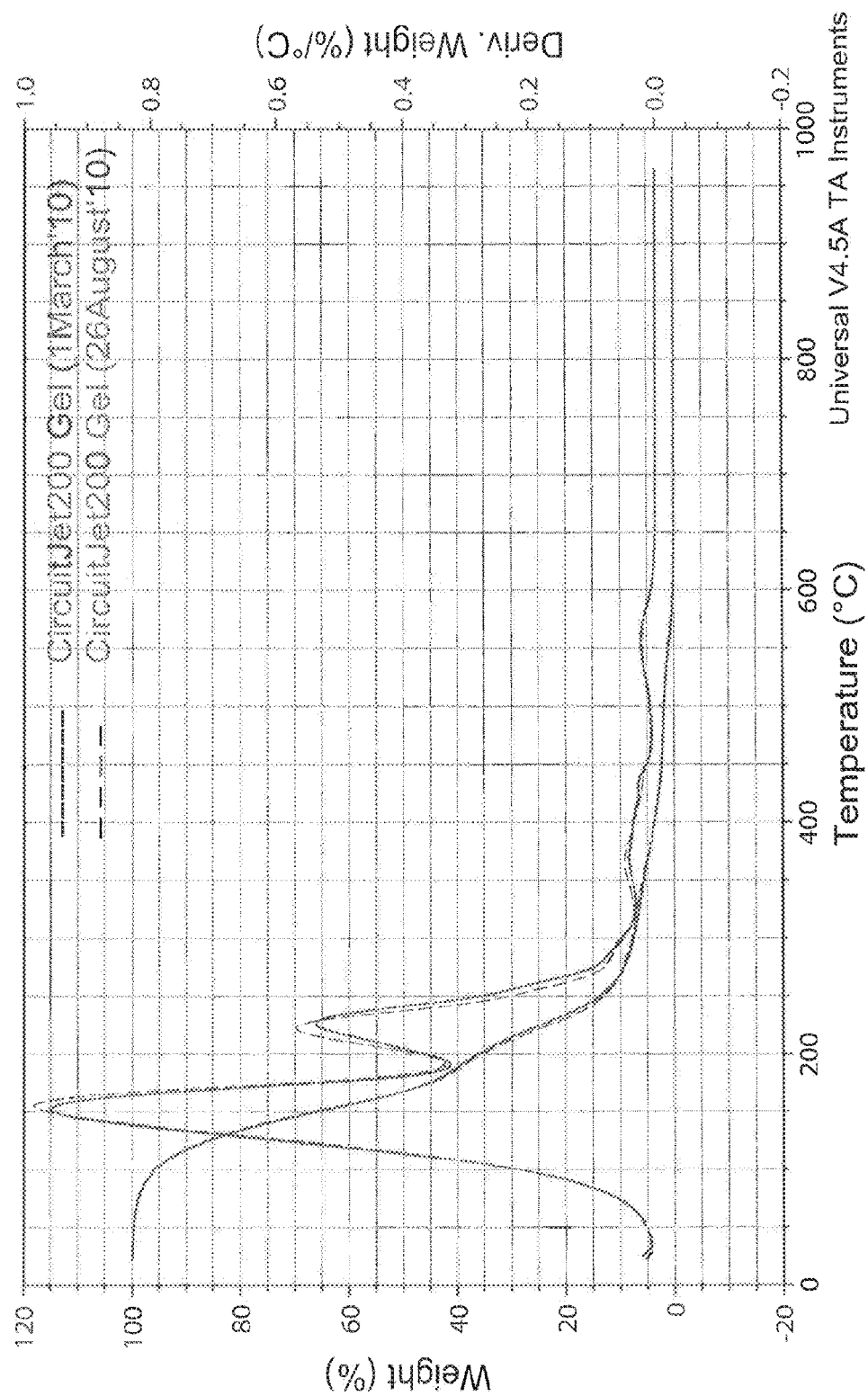
FIG. 9 is a thermogravimetric analysis micrograph of an aged CircuitJet 200 Gel.

Stability of the CircuitJet200 Gel over time was also tested. FIG. 9 shows that no significant degradation was observed for samples that were aged for six 6 months.

Figure 10:
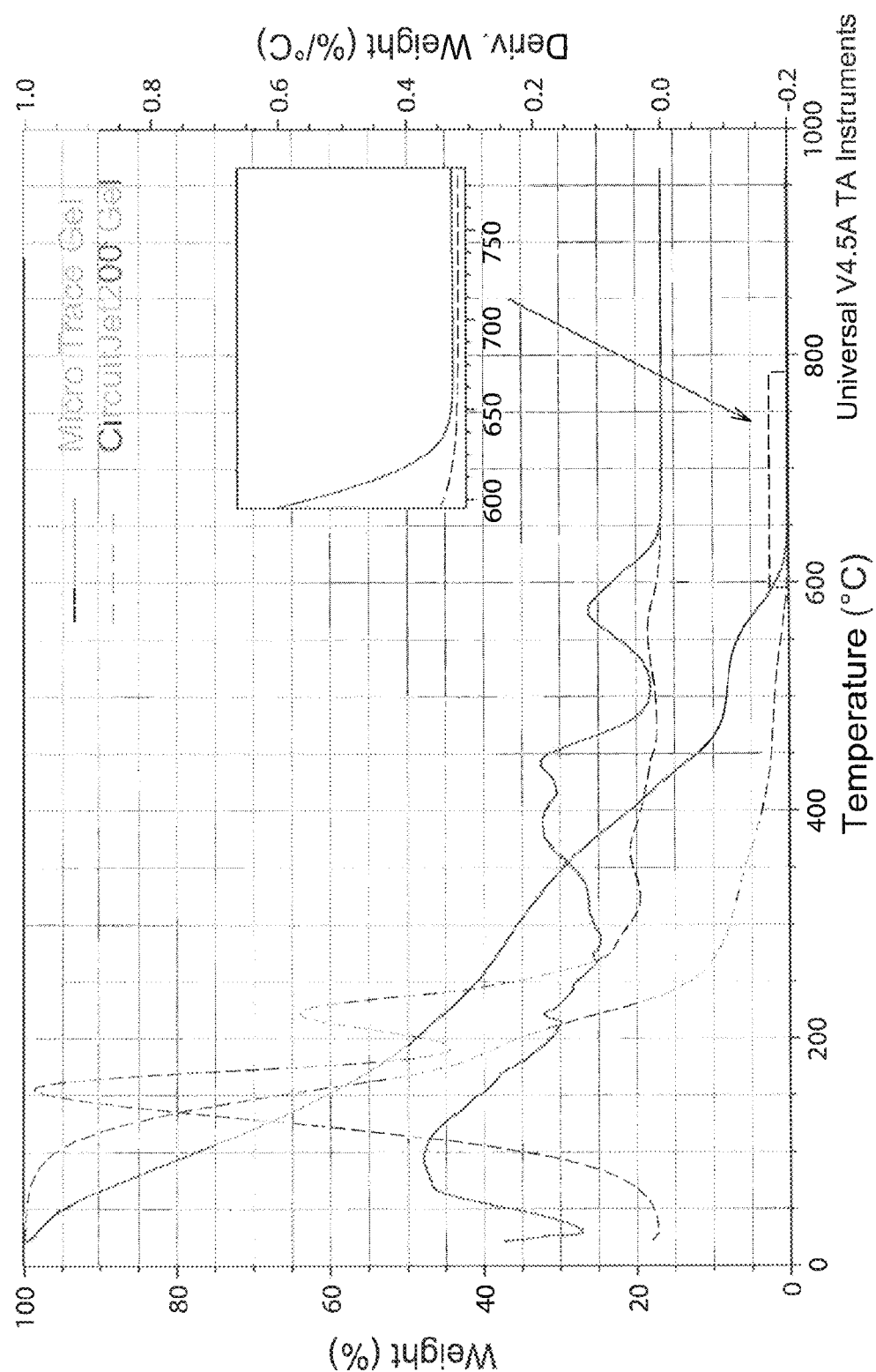
FIG. 10 is a thermogravimetric analysis micrograph of MicroTrace and CircuitJet 200 Gels.

Additionally, a second sample which was tested, the Micro Trace Gel, showed a similar thermal range of decomposition as the CircuitJet200 sample. The comparison is shown in FIG. 10. While the bulk of the two products thermal break down occurred within the 300-500° C. range, the CircuitJet200 had a lower decomposition range, i.e., below 450° C. and, more particularly, below about 300° C.

Based on TGA data, the 500-825° C. temperature range was chosen for actual production substrate experimentation. The upper temperature range is well below the melting point of aluminum (660.4° C.), therefore the substrate integrity would not be affected.

In addition, the possibility of leaching halides from the etch resist film was considered, as chloride ions are the main source for corrosion inside an electrolytic capacitor. Ion chromatography was used to measure the level of anions leaching out of the UV-cured acrylic film. A chloride level of 1.2 ppm was detected in the tested solution, which is equivalent to 7.2 ppm for a 6 g anode stack. These values are acceptable and are comparable with the ones obtained from the conventional manufacturing processes.

Figure 11:
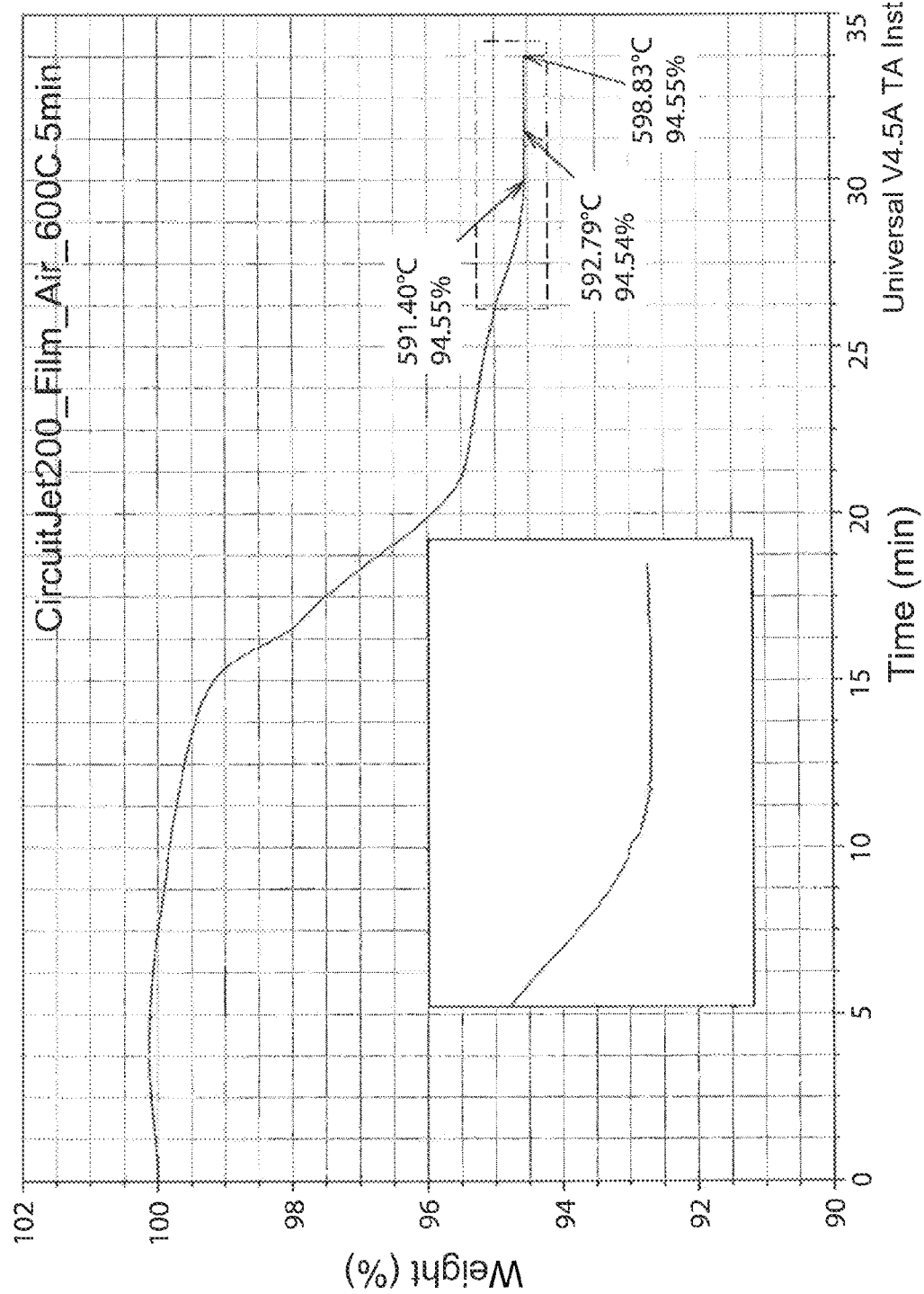
FIG. 11 is a is a thermogravimetric analysis micrograph of CircuitJet 200 Film on an Al substrate heated in air at 600° C. for five minutes.

Also, lowering the processing temperature from 625 to 600° C. and increasing the reaction time from 1 min to 5 min was also considered. The TGA micrograph for the 600° C. experiment is shown in FIG. 11.

FIG. 12 is an image of an actual production Al foil coated with a CircuitJet200 Film after thermal treatment at 625° C. for 60 seconds followed by electrochemical widening. The measured leakage currents and foil capacitance were similar to those obtained with conventional physical etch masking after hydration and formation.

It was noted that the transition definition and masked pad quality was superior in the case of thermo resist stripping process compared with physically masked foils. Typical embodiments of the thermo resist stripping process include the use of PSSA in the widening step. For example, FIG. 13 shows two micrographs of a transition region for an anode foil prepared in accordance with the present disclosure. The top image shows a resolution of 500 um, while the bottom image shows a resolution of 200 um. The unmasked portion (top side) has a rough etched surface, while the masked portion (bottom side), protected from the etch/widening processes, shows a smooth surface. The transition region between etched and masked areas is clearly defined.

It was found that the use of PSSA in the widening solution helps to protect the taper from becoming overly brittle due to reduction of surface erosion at the transition edge. FIG. 14 shows the effect of varying the concentration of the PSSA additive to a 70 Liter widening tank versus sheet capacitance of a 250 $cm^2$ sheet. FIG. 15 shows an SEM cross section of an anode foil with and without PSSA in the widening solution. As illustrated, addition of the PSSA results in increased removal of aluminum deep in the tunnels.

Figure 16:
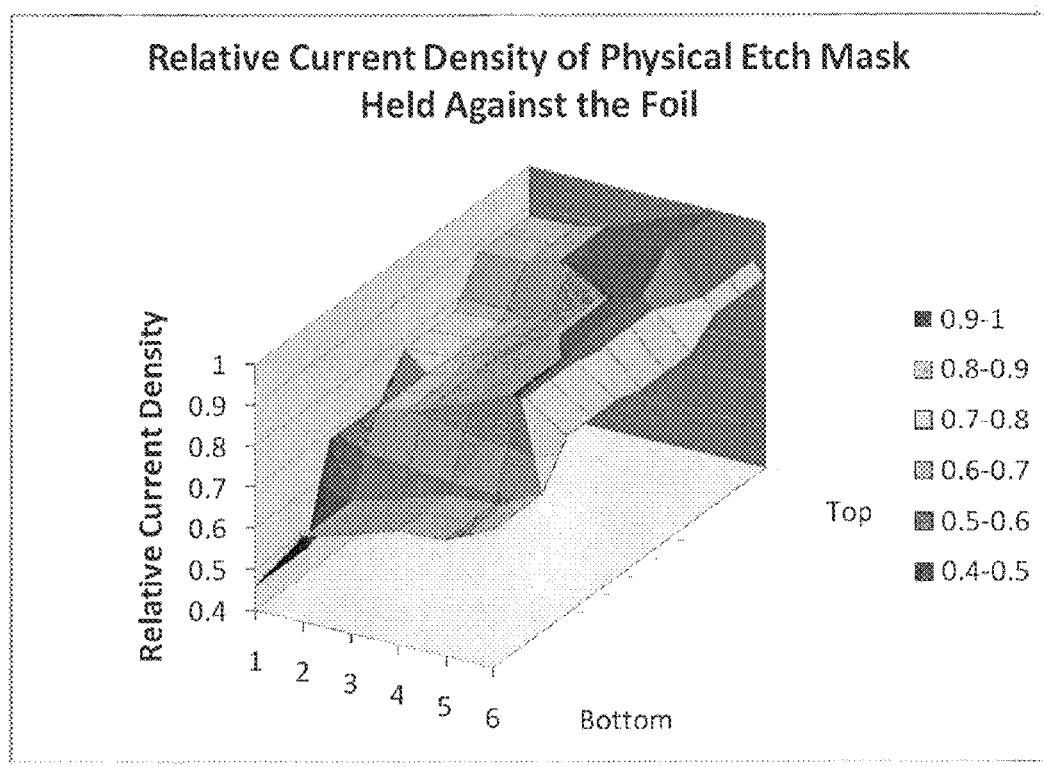
FIG. 16 is a diagram showing the relative current density with an etch mask held against the anode foil substrate.
Figure 17:
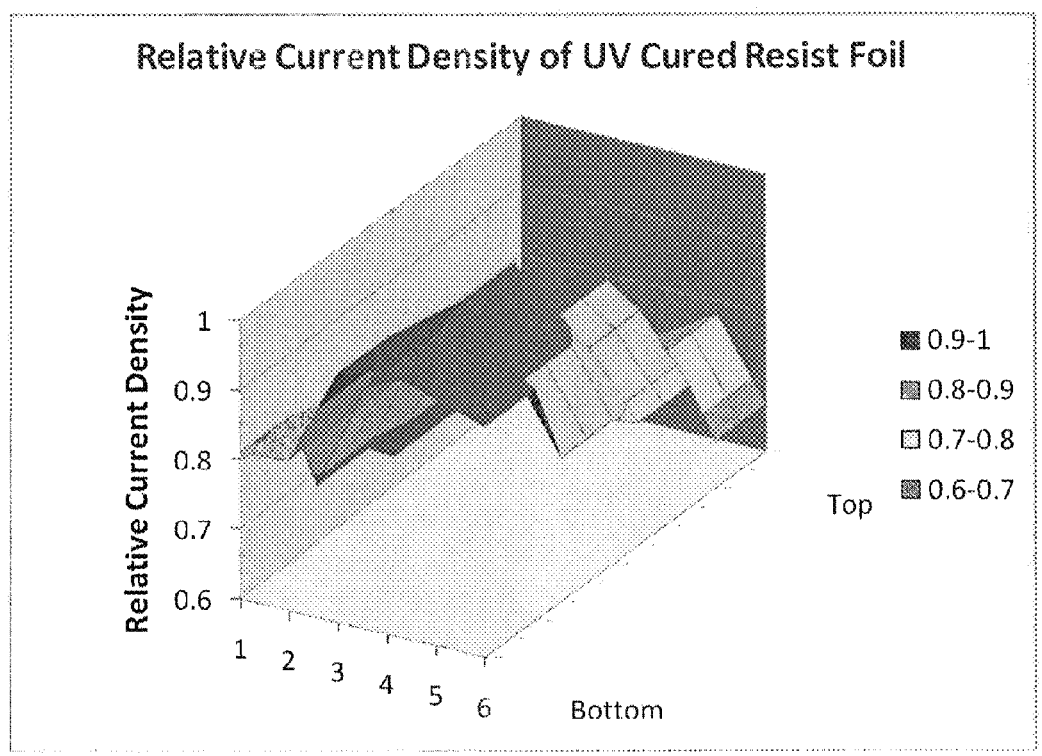
FIG. 17 is a diagram showing the relative current density with a UV-cured resist disposed on the anode foil substrate.

FIG. 16 shows the relative current density of an etch mask process similar to FIG. 1 (i.e., a physical etch mask held against a foil). FIG. 17 shows the relative current density of a UV-cured polymer photoresist process in accordance with the present disclosure. The X and Y axes represent evenly spaced intervals across a sheet of etched foil that are representative of anode punch sites. The Z axis is linearly scaled foil porosity based on the measured tunnel density.

As can be seen from inspection of these two figures, the UV-cured polymer resist process shows a smaller current gradient. Thus, providing an improvement over the patterning capabilities of conventional anode foil manufacturing techniques.

In accordance with the present disclosure, the patterned photoresist may be applied in different shapes and sizes, with tapering or with very little tapering to control and improve the amount of the etched area per anode foil, while not affecting the transition area or causing brittleness in the anode foil. The patterned photoresist may be formed as one or more circles, polygons, or combinations thereof. The present invention is not limited to any particular layout of the patterned photoresist.

Illustrative Embodiments

In one illustrative embodiment of the present invention, a method of manufacturing an anode foil suitable for use in an electrolytic capacitor is disclosed. The anode foil includes surface area enhancements formed therein. The method includes disposing a resist material in a predetermined pattern on an exposed surface of an anode foil substrate, such that a first portion of the exposed surface of the anode foil substrate is covered by the resist material, and a second portion of the exposed surface is uncovered; polymerizing the resist material; exposing at least the second portion of the exposed surface to one or more etchants to form a plurality of tunnels; stripping the polymerized resist material; and widening at least a portion of the plurality of tunnels.

In another illustrative embodiment, the method includes printing a resist in a predetermined pattern on a first surface of a substrate, such that a first portion of the first surface is covered by the resist, and a second portion of the first surface is exposed; polymerizing the resist material; exposing the substrate having the polymerized resist thereon to one or more etchants so as to form a plurality of etched areas in the second portion of the first surface; performing a resist strip operation; widening one or more of the plurality of etched areas; and hydrating the substrate.

In yet another illustrative embodiment, the method includes providing an anode foil substrate, wherein the substrate is in the form of a web to facilitate continuous processing. A resist material is printed in a pattern on a surface of the anode foil substrate. The resist material contains acrylic monomers and UV photo-initiators. The resist material is then UV-cured before etching the anode foil to form a plurality of etched areas therein. The plurality of etched areas are then exposed to a widening solution containing polystyrene-sulfonic acid. Finally, an oxide layer is formed on the anode foil substrate.

In still another illustrative embodiment, the method includes providing a web of anode foil starting material, positioning the web so that it is in a known spatial relationship with at least one ink-jet type photoresist dispenser, dispensing photoresist from the at least one photoresist dispenser onto the web to form a predetermined pattern of photoresist, and then curing the photoresist. Tunnels are then formed in the exposed regions of the web, the cured photoresist is thermally stripped, and the tunnels are widened. In some embodiments, the photoresist pattern dispensed by the inkjet type photoresist dispenser is presented to a visual inspection system prior to etching.

It is noted that the anode foil substrate is typically aluminum, but aluminum is not required, and other substrate materials may be used. It is further noted that the UV-cured resist should thermally decompose at a temperature below a temperature that would adversely affect the physical and/or electrical properties of the anode foil substrate.

Electrolytic capacitors according to the present invention can be incorporated into various products using such capacitors, including, but not limited to implantable medical devices, such as implantable cardioverter defibrillators.

CONCLUSION

It is noted that the Detailed Description section, and not the Summary and Abstract sections, is intended to be used to interpret the claims. The Summary and Abstract sections can set forth one or more, but not all exemplary embodiments of the present invention as contemplated by the inventors, and thus, are not intended to limit the present invention and the subjoined claims in any way.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the subjoined Claims and their equivalents.

What is claimed is:

1. A method of manufacturing an anode foil suitable for use in an electrolytic capacitor, comprising:
   disposing a resist material in a predetermined pattern on an exposed surface of a continuous web of anode foil substrate, such that a first portion of the exposed surface of the anode foil substrate is covered by the resist material, and a second portion of the exposed surface is uncovered;
   polymerizing the resist material;
   exposing at least the second portion of the exposed surface to one or more etchants to form a plurality of tunnels;
   thermally stripping the polymerized resist material using gas temperatures above 200° C. and below a melting point of the anode foil; and
   widening at least a portion of the plurality of tunnels.

2. The method of claim 1, wherein disposing the resist material in a predetermined pattern comprises applying the resist material by ink-jet printing.

3. The method of claim 1, wherein disposing the resist material in a predetermined pattern comprises applying the resist material by stamping.

4. The method of claim 1, wherein the resist material comprises acrylic monomers and ultraviolet photo initiators.

5. The method of claim 1, wherein the resist material is a liquid comprising acrylic monomers and ultraviolet photo initiators.

6. The method of claim 1, wherein thermally stripping the polymerized resist material comprises forced air drying and baking at a temperature sufficient to break down and oxidize the polymerized resist material.

7. The method of claim 1, wherein widening comprises exposing the etched anode substrate to polystyrenesulfonic acid.

8. The method of claim 7, further comprising a step after the widening step of hydrating the etched substrate.

9. The method of claim 7, further comprising a step after the stripping step of vaporizing residue disposed on the etched anode substrate.

10. The method of claim 7, further comprising:
    heat treating the anode foil to remove residue; and
    forming an oxide layer on the etched anode substrate.

11. A method of manufacturing an anode foil suitable for use in an electrolytic capacitor, comprising:
    disposing a resist material in a predetermined pattern on an exposed surface of a continuous web of anode foil substrate, such that a first portion of the exposed surface of the anode foil substrate is covered by the resist material, and a second portion of the exposed surface remains exposed;
    polymerizing the resist material;
    exposing the second portion of the exposed surface to at least one etchant to form a plurality of etched areas;
    thermally stripping the polymerized resist material by heating the anode foil substrate to a temperature above 200° C. and maintaining the temperature less than the melting point of the anode foil substrate; and
    widening at least a portion of the etched areas.

12. The method of claim 11, wherein disposing the resist material in a predetermined pattern comprises applying the resist material by ink-jet printing.

13. The method of claim 11, wherein disposing the resist material in a predetermined pattern comprises applying the resist material by stamping.

14. The method of claim 11, wherein disposing the resist material in a predetermined pattern comprises applying the resist material by screen printing.

15. The method of claim 11, wherein the resist material comprises acrylic monomers and ultraviolet photo initiators.

16. A method of manufacturing an anode foil suitable for use in an electrolytic capacitor, comprising:
- disposing a resist material in a predetermined pattern on a first portion of a surface of a continuous web of anode foil substrate that has edges, such that a second portion of the surface of the anode foil substrate is not covered by the resist material, wherein the first portion includes a frame on the edges of the anode foil substrate;
- polymerizing the resist material;
- exposing the second portion of the anode foil substrate to one or more etchants to form a plurality of tunnels;
- thermally stripping the polymerized resist material at a gas temperature above 200° C. and below a melting point of the anode foil; and
- widening at least a portion of the plurality of tunnels.

17. The method of claim 16, wherein disposing the resist material in a predetermined pattern comprises applying the resist material by ink-jet printing.

18. The method of claim 16, wherein disposing the resist material in a predetermined pattern comprises applying the resist material by stamping.

19. The method of claim 16, wherein disposing the resist material in a predetermined pattern comprises applying the resist material by screen printing.

20. The method of claim 16, wherein the resist material comprises acrylic monomers and ultraviolet photo initiators.

* * * * *